May 31, 1938.  L. A. PARSONS  2,119,348
SEPARATOR
Filed July 27, 1935  5 Sheets-Sheet 1

Inventor
Lewis A. Parsons
By Hardway Lathey
Attorney

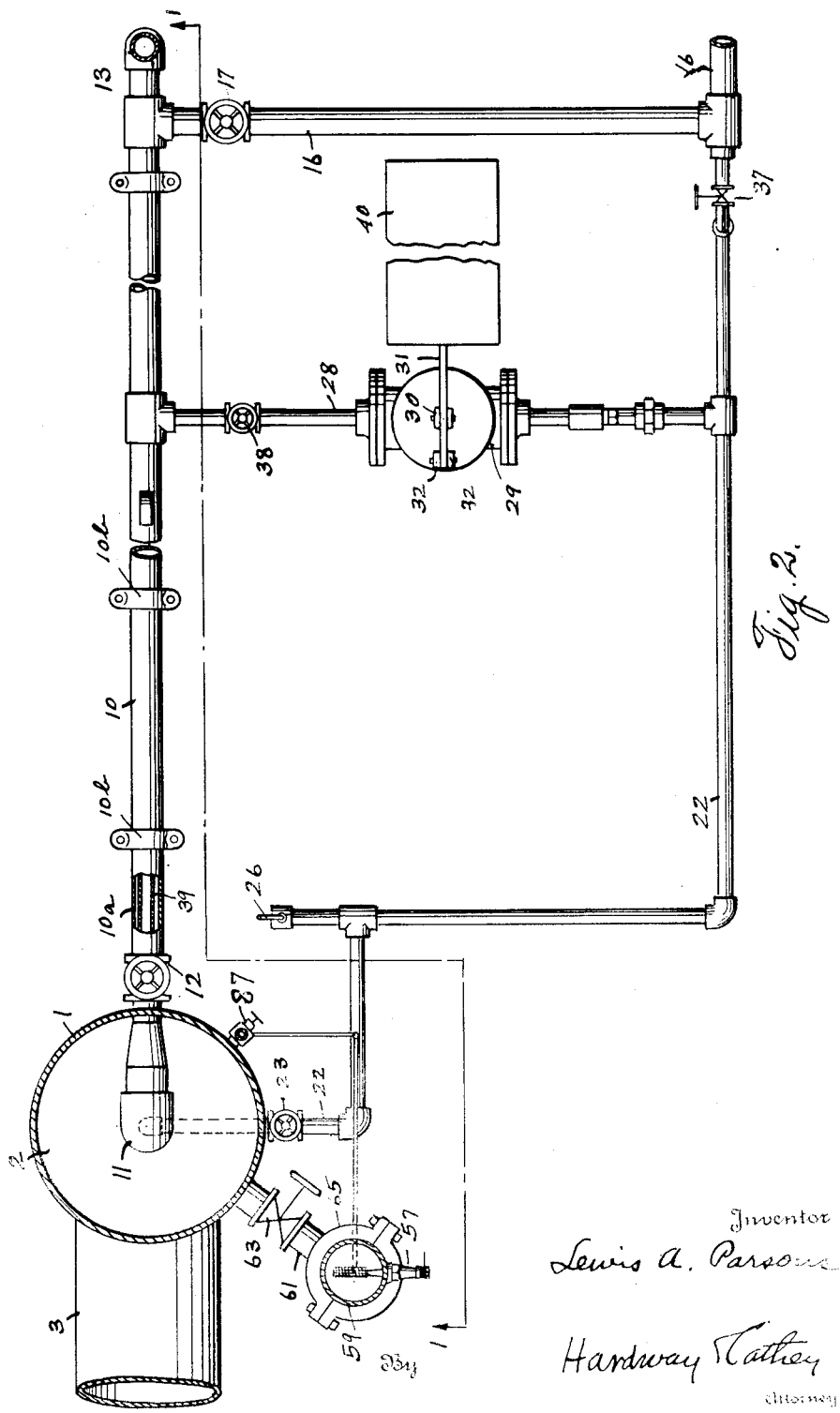

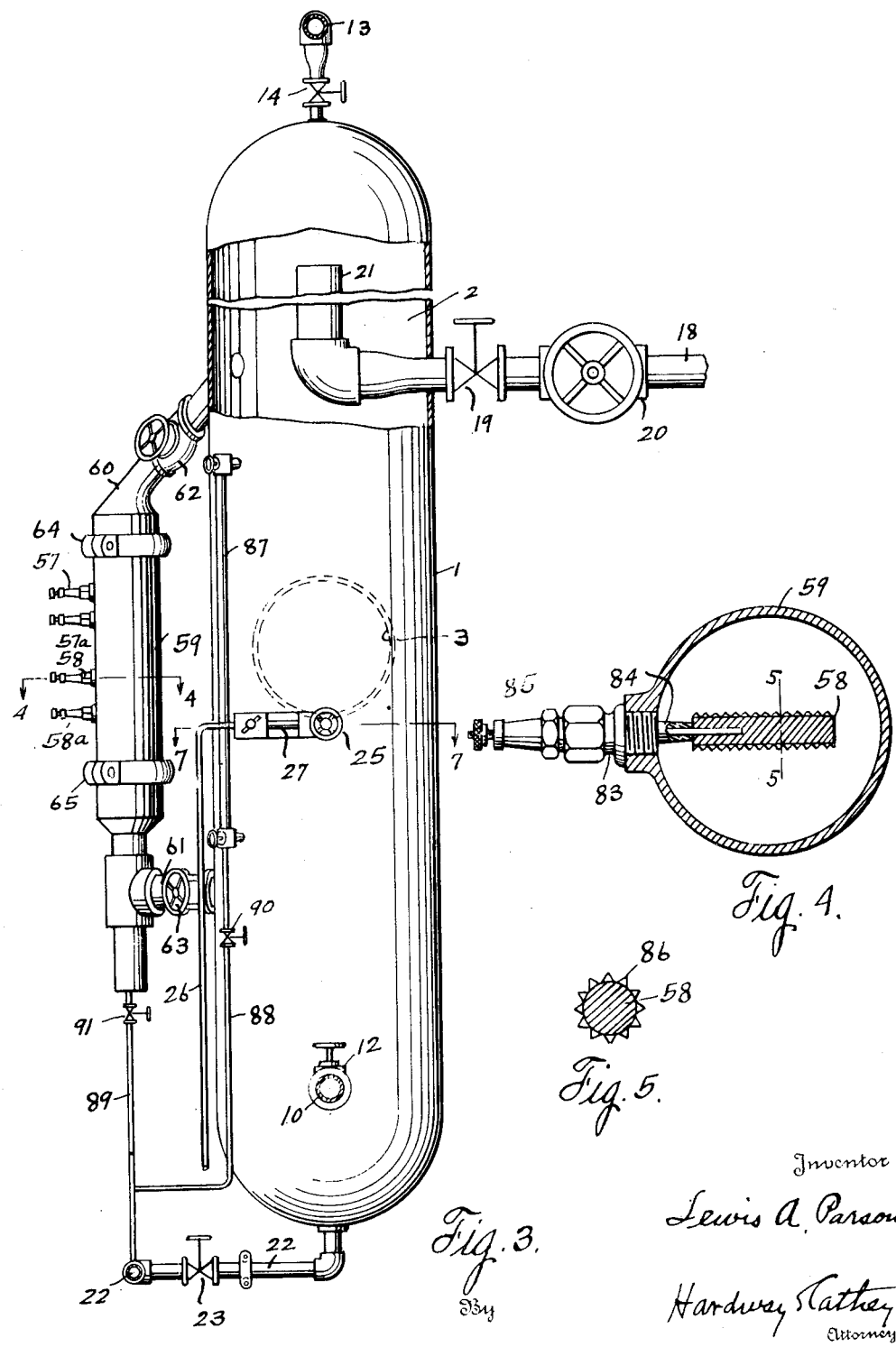

May 31, 1938.　　　　L. A. PARSONS　　　　2,119,348
SEPARATOR
Filed July 27, 1935　　　　5 Sheets-Sheet 4

Inventor
Lewis A. Parsons
Hardway Cathey
Attorneys

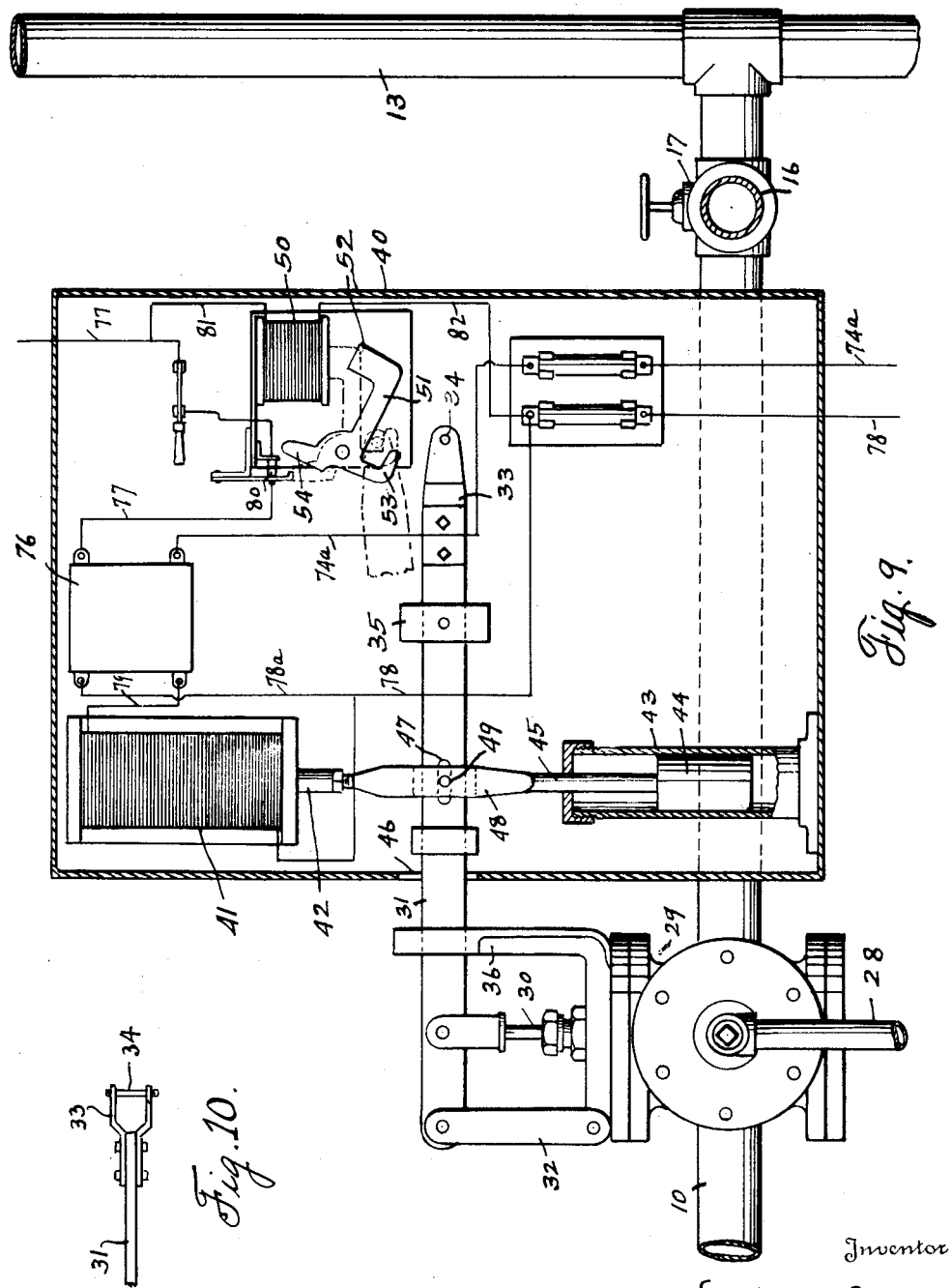

Patented May 31, 1938

2,119,348

UNITED STATES PATENT OFFICE 2,119,348

SEPARATOR

Lewis A. Parsons, Houston, Tex.

Application July 27, 1935, Serial No. 33,443

14 Claims. (Cl. 210—51)

This invention relates to a separator.

An object of the invention is to provide a separator specially designed for the purpose of separating a liquid of higher gravity from a liquid of lower gravity; the apparatus has been provided more particularly for separating crude oil, as it is produced from a well, from water that may be mingled therewith, as well as from all, or at least a portion of, sand, grit, and other detritus that may be in suspension in the liquid.

A further object is to provide a separator of the character described whereby water, separated from oil, may be intermittently discharged from the apparatus.

A still further object is to provide a separating apparatus having novel means for intermittently and automatically discharging the liquid separated from the oil.

A still further feature of the invention resides in the provision of means whereby the sand, grit, and other detritus in suspension in the well liquid may be separated, at intervals, from the liquid.

The invention also comprehends a discharge valve for controlling the discharge of the collected water that may be separated from the oil and novel electrically controlled means for operating the valve intermittently in accordance with the volume of the water separated from the oil.

In the production of crude oil from an oil well, the oil discharge line is usually provided with a choke of conventional construction for controlling the output of oil from the well so that the well will be maintained at the allowable production.

Crude oil, as produced from a well, sometimes contains a certain amount of water, as well as sand and other detritus. It is desirable that this oil and detritus be separated as far as possible before the oil passes through the choke; otherwise, the allowable amount of pure oil will not be obtained from the well in accordance with the prevailing pro rata regulations. Furthermore, if the mixture of oil, and water is permitted to pass through the choke under pressure, the liquid will be emulsified, and it is difficult thereafter to separate the oil from the water. It is therefore a prime object of the invention to provide apparatus of the character described that may be connected into the outflow line from the well between the well and the choke for separating the oil from the other liquid and allowing only the pure crude oil to flow through the choke and into the outflow oil line.

With the above and other objects in view the invention has particular relation to certain novel features of construction, operation and arrangement of parts, an example of which is given in this specification and illustrated in the accompanying drawings wherein:

Fig. 2 shows a horizontal, sectional view taken on the line 2—2 of Fig. 1.

Fig. 3 shows a vertical, sectional view taken on the line 3—3 of Fig. 1.

Fig. 4 shows a transverse, sectional view taken on the line 4—4 of Fig. 3.

Fig. 5 shows a fragmentary, cross-sectional view taken on the line 5—5 of Fig. 4.

Fig. 9 shows a side elevation of the discharge valve and the valve operating mechanism connected thereto, said operating mechanism being shown partly in section, and Fig. 10 shows a fragmentary, plan view of the valve-operating lever.

Figure 1:
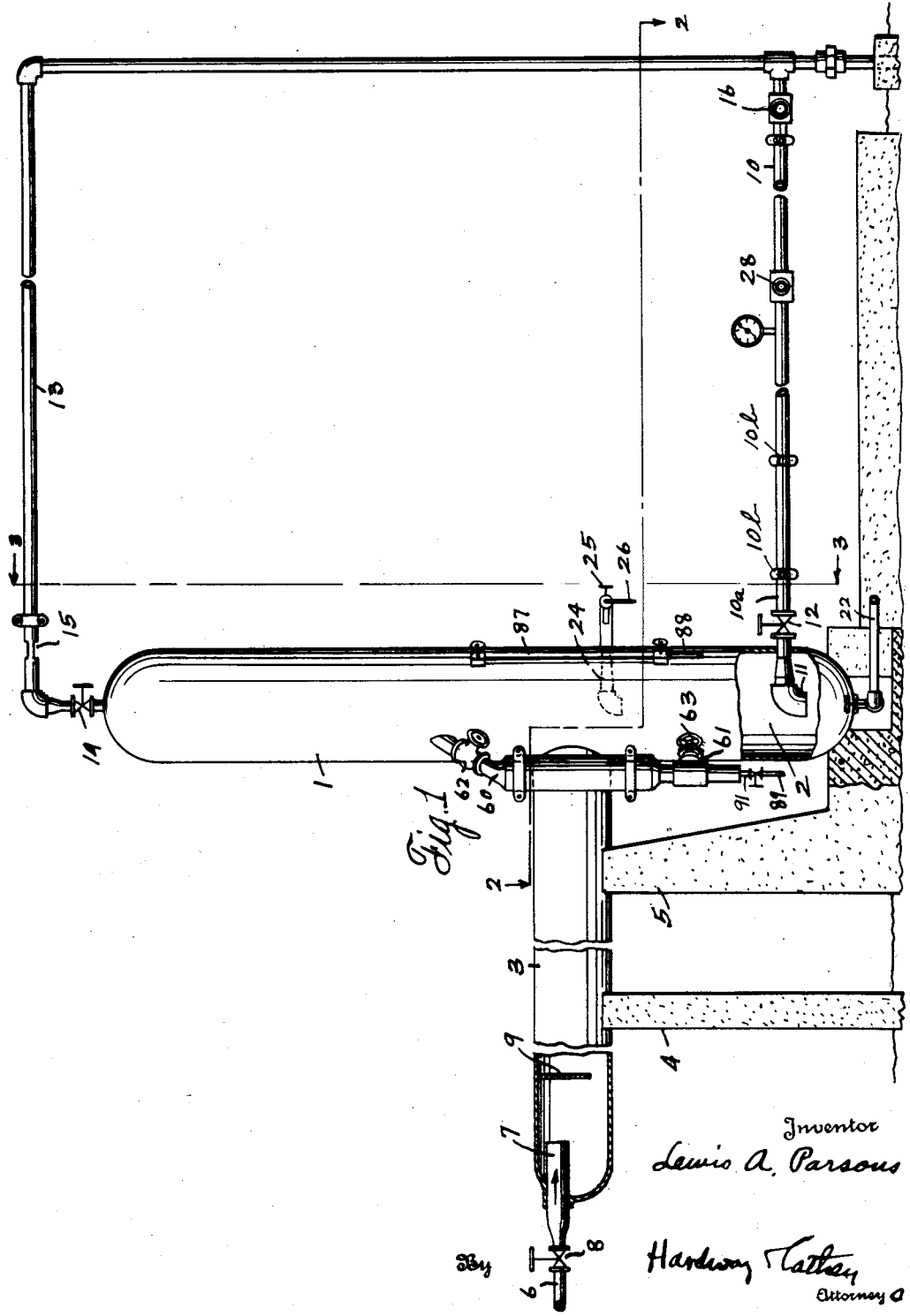
Fig. 1 shows a vertical sectional view taken on the line 1—1 of Fig. 2 and showing certain parts broken away for better illustration.
Figure 6:
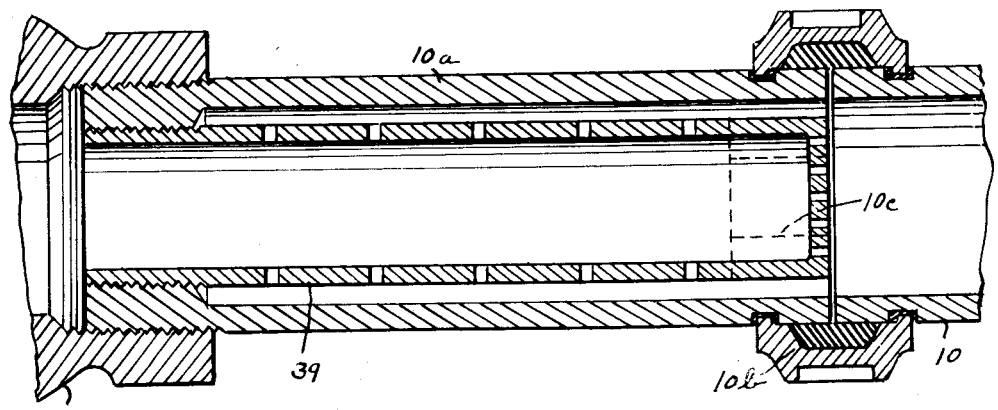
Fig. 6 shows an enlarged, longitudinal sectional view of the water discharge pipe, showing a strainer therein.
Figure 7:
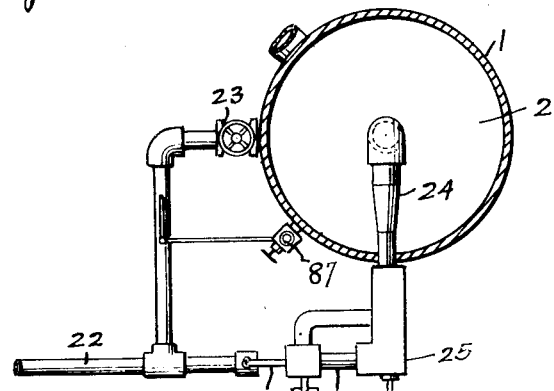
Fig. 7 shows a horizontal, sectional view taken on the line 7—7 of Fig. 3.
Figure 8:
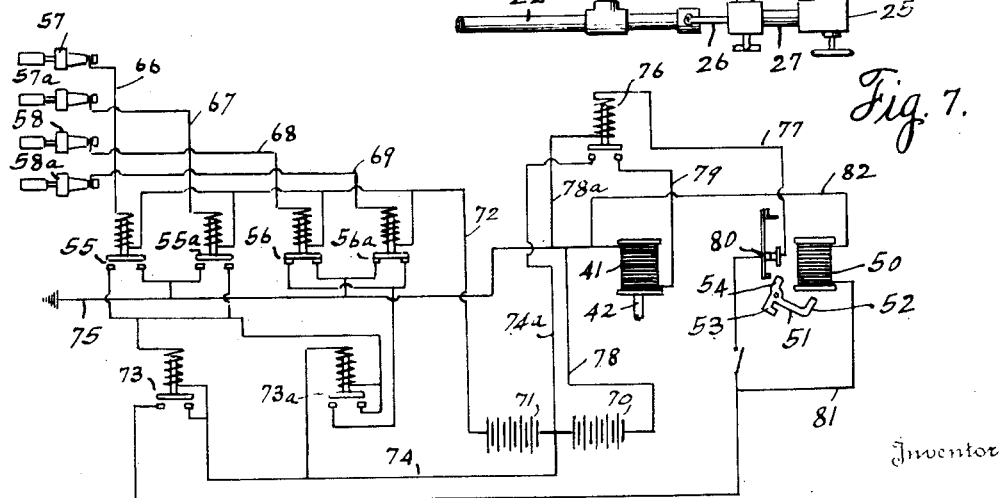
Fig. 8 shows a wiring diagram.

Referring now more particularly to the drawings, wherein like numerals of reference designate the same parts in each of the figures, the numeral 1 designates a vertically disposed header which is closed, except as hereinafter stated, at its upper and lower ends. This header forms a separating chamber 2 wherein oil produced from the well is separated from the water and solid material. Connected into the header intermediate its upper and lower ends and at the required distance from its lower end, there is a tubular receiver 3 which is suitably supported by the pedestals 4, 5. The receiver is approximately horizontal, although it has been found in practice that it may be advantageous for cleaning purposes that said receiver decline slightly toward the header. The line 6 leading from the producing well has its outer, or discharge, end connected into the outer end of the receiver 3 and this end of the line 6 may be enlarged, if desired, forming a nozzle 7. The line 6 may be controlled by a suitable valve, as 8. The receiver 3 is preferably, although not necessarily, provided with a baffle 9 therein which is spaced in front of the discharge nozzle 7. In case the oil flows from the well under strong pressure, this baffle will reduce the agitation in the receiver 3 and conduce to the settling of the water and detritus, in the oil, to the bottom of the receiver, and from this receiver the liquid and solid material passes on into the header 1. The oil will rise in said header, floating on the water, and the water will fill the lower portion of the header while certain solid material in suspension will tend to float on the water and collect between the water and oil in the header. The gas rising from the oil will collect in the extreme upper end of the header.

Leading out from the lower portion of the header the required distance above the lower end thereof, there is a water discharge line 10. The inner end of this line is extended into the header and has the downwardly turned intake nozzle 11. This water discharge line may be controlled by a suitable valve 12.

Leading out from the extreme top of the header, there is a line 13 which is equipped with a control valve 14 and which is formed with a suitable choke 15 out beyond said control valve. The line 13 is connected into the water discharge line 10, as more accurately shown in Figs. 1 and 2. A branch line 16 is connected into the water discharge line 10, and is equipped with a control valve 17 and leads on to the pit or other receptacle for the discharged water.

Leading out from the upper portion of the header, there is an oil discharge line 18 which is equipped with a suitable control valve 19, as well as with a conventional choke 20 out beyond the valve 19. The inner end of the line 18 is extended into the header and formed with an upwardly directed intake nozzle 21. The discharge line 18 leads to a suitable receptacle provided for the reception of the produced oil.

As hereinabove indicated, the water which collects in the bottom of the header will be automatically discharged intermittently and during the normal operation of the apparatus, the valves 12 and 14 will remain open and the valve 17 will be closed. The liquid in the header 1 and in the upleg of the pipe 13 will be at a common hydrostatic head and as the water is intermittently discharged from the header and as the header is refilled with the oncoming liquid, the pressure in the header will vary, the gas trapped in the upper end of the header above the nozzle 21, and in the pipe 13 forming a cushion to relieve the water hammer; that is, the shock of the surge of liquid when the water discharge line is closed. The nozzle 21 is of such capacity that when the water discharge line is opened and the water is discharged, and the level of the oil is lowered, due to the expansion of the trapped gas, beneath the upper end of the nozzle 21, there will remain in said nozzle a sufficient volume of oil to maintain a continuous flow through the choke 20 until the water discharge line 10 has closed and the level of the oil has risen above the nozzle 21 and said nozzle has become submerged in and filled with the oil. This prevents the gas from flowing under pressure through the choke and lowering the temperature thereof, which, if allowed to happen, might cause the choke to freeze up and stop the flow from the well during cold weather, to the injury, or possibly destruction of the well.

Leading out from the extreme bottom of the header, there is a drain line 22 which is equipped with the control valve 23 and which leads to, and is connected into, the water discharge line 16, as more accurately shown in Fig. 2. This drain line is provided primarily for the purpose of draining out sand and other semi-solid material that may collect in the header.

As hereinabove stated, a certain amount of detritus, of a semi-solid nature, will gradually collect in the header and will float on the water beneath the oil above. It is advisable to drain this material off at intervals and for that purpose a drain nozzle 24 has been provided. This drain nozzle is fitted through the wall of the header and its inner end is downwardly turned. It is equipped with a suitable valve 25 which is normally closed, but which may be opened when it is desired to relieve the accumulation of said material from the header. This drain nozzle is equipped with a downwardly extended drain pipe 26 which is connected into the pipe 22 and also is provided with a sight gauge 27. Upon opening of the valve 25, the objectionable accumulations may be drained out from the header and the character of the material being drained off may be ascertained by inspection of the gauge 27.

A transverse pipe 28 connects the water discharge line 10 with the drain pipe 22 and incorporated into this pipe 28 there is a suitable valve mechanism 29 which contains any type of conventional valve for controlling the pipe 28, said valve being operable by the stem 30. There is a valve lever 31, one end of which is pivoted to the upper end of the links 32, the lower ends of these links being pivoted to the valve casing. The other end of the lever 31 may be formed with a yoke 33 having the cross-pin 34. The valve stem 30 is connected to the lever at an intermediate point, and said lever is equipped with a weight 35 which normally operates to maintain the valve in closed position. The valve casing 29 is also provided with a suitable guide 36 for confining the direction of movement of the lever to a vertical course. Upon opening of the valve the water may freely drain out through the line 10 and pipe 28 and thence through the pipe 22 to the branch line 16 and thence to the pit, or other receptacle. The drain line 22 is equipped with a valve 37 whereby said line may be opened and closed, the valve 37 being located between the transverse pipe 28 and the branch line 16. The pipe 28 also is equipped with a valve 38 which is located between the control valve mechanism 29 and the water discharge pipe 10. During the normal operation of the apparatus, the valve 12 will be open, as hereinabove stated. The valves 37 and 38 will also be open and the valve 17 closed.

It is desirable that provision be made for screening the outgoing water to prevent solid material from reaching the control valve mechanism 29. For this purpose one section 10a of the water discharge pipe is screwed into the casing of the valve 12 and is connected to the adjacent section of the water discharge pipe by a victaulic opening 10b. The end of the section 10a which is screwed into the casing of the valve 12 is inwardly thickened and internally threaded and a perforated thimble 39 has its open end screwed into the inwardly thickened end of the section 10a. The thimble is suitably perforated around its walls and at its outer end and has its inner end, directed toward the on-coming liquid, open. This thimble will arrest and collect solid materials in the water which might interfere with the operation of the control valve mechanism. The outer end of the thimble is preferably formed hexagonal as at 10c. In case the thimble 39 becomes filled with solid material so as to appreciably restrict the flow of the water, the victaulic couplings 10b may be removed and access to the thimble thus attained, and a socket wrench may then be applied to the exposed end of the thimble and it may be unscrewed, cleaned out, and replaced.

It is desirable, and for practical purposes necessary, to provide automatic means for intermittently opening the controlling valve mechanism which is incorporated into the pipe 28 as well as for automatically closing said valve when the accumulated water has been drained from the header 1. This valve-controlling mechanism should be of such construction that the valve will open and drain out the water upon the accumulation of a predetermined quantity of water in the header and in all events should be so constructed as to relieve the accumulation of water before enough water accumulates to mingle with the oil and flow out through the line 18. A preferred type of electrically controlled valve actuating mechanism has been provided and will presently be described. This type of valve-actuating mechanism is now believed to be the preferred type, although it is not intended to limit the invention to the particular form shown.

Mounted in a suitable box, or casing, 40, there is an electro-magnet 41 having a core 42, and mounted in the box 40 beneath the electro-magnet there is a closed cylinder 43 in which there is a loosely mounted plunger 44 which is connected to the core 42 by means of a rod 45. The cylinder 43 may be filled with a suitable light fluid, thus providing a dash pot, sufficient clearance being left between the cylinder 43 and the plunger 44 to permit the liquid to pass back and forth. The valve-actuating lever 31 extends through a suitable vertical slot 46 into the casing 40 and is provided with an elongated slot 47. The rod 45 is formed with a suitable yoke 48 through which the lever 31 passes, and a cross-pin 49 is attached to the yoke and passes through the slot 47 and forms an operable connection between the rod 45 and the lever 31. The slot 47 is elongated so as to allow the pin 49 the required range of movement relative to said slot to prevent binding, and to permit the core 42 and the rod 45 to move in a straight line course. The dash pot protects the valve 29 and its operating mechanism against severe shocks in operation.

The numeral 50 designates a latch coil which is mounted in the box 40. There is a pivotally mounted arm 51 having an overturned end forming an armature 52 at the free end of the arm. The pivotally mounted end of the arm 51 has the overturned hook forming a latch 53, and said pivoted end also has the upwardly extended finger 54. Upon upward movement of the lever 31, effected as hereinafter explained, the cross-pin 34 will engage and elevate the arm 51, carrying the armature 52 within the range of influence of the coil 50, and at the same time carrying the latch 53 underneath the pin 34 between the arms of the yoke 33. When the valve attached to the stem 30 is opened as hereinafter explained, the water will be discharged from the header 1 and this discharge will continue so long as the coil 50 is energized, the valve being held open by the latch 53. Upon the breaking of the electrical circuit through the coil 50, as will be hereinafter explained, the armature 52 will be released, as will also the pin 34, and the lever 31 will move downwardly under the influence of the weight 35, thus closing the control valve attached to the stem 30 and shutting off the discharge of water from said header.

Relays 55, 55a, 56, and 56a are provided, and these relays are connected in circuit with the respective electrodes 57, 57a, 58, and 58a. These electrodes are of the general form of ordinary spark plugs and are extended through and anchored to the wall of the tubular manifold 59. There are the upper and lower tubular connections 60, 61, which are controlled by the respective upper and lower valves 62, 63. These connections are connected into the header 1, respectively, above and beneath the receiver 3, that is, above and beneath, respectively, the normal water level in the header. The electrodes 57, 57a are also above the normal water level, and the electrodes 58, 58a are beneath it. The connections 60, 61, are connected to the main body of the manifold 59 by means of the Victaulic couplings 64, 65. This type of coupling is employed so that in case it becomes necessary to repair, remove, or replace the manifold, the valves 62 and 63 may be closed and the coupling 64, 65 released and the manifold removed for the purposes stated, without interfering with the operation of the separator. Relays 55, 55a are connected to the electrodes 57, 57a by means of the wiring 66, 67, and the relays 56, 56a are connected to the electrodes 58, 58a by the wiring 68, 69. Suitable batteries 70, 71, are provided and connected in series and the last-mentioned battery is connected by the wiring 72 with the coils of said relays. It will be noted that the electrodes and relays are arranged in pairs. This is to insure the operation of one of each pair should the other for any reason fail.

The electrodes 57 and 57a are normally in oil and the electrical circuit to the coils of the relays 55, 55a is broken and the contacts of the relays 55, 55a are open. The electrodes 58, 58a are normally under water, and the contacts of the corresponding relays 56, 56a are closed. It may be here stated that the water which collects in the header 1 is usually salt water, and of such a character as to form a good conductor. When the salt water rises to electrode 57a, a circuit is completed and the relay contact 55a is closed. Should the electrode 57a for any reason be out of order or not complete the circuit, the water will continue to rise to the electrode 57 and the circuit will be completed and the relay contact 55 will be closed. There are also the relays 73, 73a. When the contact of either relay 55 or 55a is closed, the relays 73, 73a are grounded through wiring 75; the coils of these last-mentioned relays being connected with the battery 70 through the wiring 74. Once the contact of relay 73a is closed, it is maintained closed through the relay 56, or 56a, until the salt water drops below the electrode 58a, the relay 73a thus acting as a holding coil which keeps the relay contact 73 closed as long as salt water is over the electrode 58a.

When the contact of relay 73 closes, it energizes the coil of the relay 76 as well as the latch coil 50. The coil of the relay 76 is connected into the battery circuit through the wiring 74, 77, 78a and 78, and upon closing of the contact of relay 73, the coil of the relay 76 will be energized and the switch closed, thus completing a circuit through the wiring 74a, 79, the electro-magnet 41, and the wiring 78. The valve controlling the water discharge line will thereby be pulled open, and when fully open the lever 31 will act to carry the armature 52 within the range of the latch coil 50, as hereinabove explained. Thereupon the finger 54 will engage and open the switch 80, thus opening the circuit through the relay coil 76 and the electro-magnet 41 to prevent drainage of the batteries. The valve is then held in open position by the latch coil which is maintained in the electrical circuit through the wiring 81, 82. The valve is held open until there is a sufficient discharge of the water to cause the salt water to drop below the electrodes 58 and 58a, if both are functioning, and when this occurs, the circuit through the coils of relays 56, 56a, will be broken, causing the corresponding contacts to open, as also the contacts of the relays 73, 73a, thus breaking the circuit through the latch coil 50 and permitting the valve controlling the water discharge line 10, 28, to close. The cycle is then ready to be repeated as soon as the water rises again to electrode 57a.

It will thus be noted that the relays 55, 56, complete purely standby circuits. In case of trouble with the electrodes 57a, 58a, or their corresponding relays 55a, 56a, the said standby circuits have been provided for such an emergency.

Special attention is here called to the construction of the electrodes 57 to 58a inclusive. This construction is best illustrated in Figs. 4 and 5. It is of the general form of an ordinary spark plug, as hereinabove indicated, having an outer metallic shell 83 with the porcelain 84 suitably anchored therein. A rod 85 extends axially through the porcelain and projects beyond it. The electrode proper, 58, as shown in Fig. 4, is formed of metal, having good conducting qualities and is preferably cylindrical in general contour and is securely fastened to the projecting end of the rod 85 in abutting relation to the porcelain. It is grooved longitudinally as well as circumferentially, as better shown in Fig. 5, so that its external surface is formed with outwardly extending projections 86 which taper to points. An electrode of this type is not liable to become coated with paraffin or other coating material to such extent that at least some of the projections 86 will not be exposed and form a contact with the salt water.

Referring to Figs. 1 and 2, the header is shown equipped with a suitable transparent gauge 87 so that the level of the water in the header will be at all times visible and the lower end of this gauge is connected by the tube 88, into a tube 89 which leads downwardly from the manifold 59 and is connected into the pipe 22. The tubes 88, 89, have control valves 90, 91, respectively, for opening and closing said tubes.

When it is desired to cleanse the electrodes, the valves 61, 62 may be closed and the valve 91 opened to relieve the pressure in the manifold and the electrodes unscrewed and removed singly and cleansed and replaced. Should solid, or semi-solid, material collect in the manifold, the valve 63 may be closed, and the valve 91 opened and a pure oil will then flow downwardly through the manifold and flush the same out as well as wash off, and cleanse the electrodes.

The drawings and description, while disclosing what is now considered to be the preferred form of the invention, are primarily intended to illustrate the principle of the invention which will be defined, broadly, by the appended claims.

What I claim is:

1. A separator comprising a container having a separating chamber provided with an oil outlet, a water discharge outlet beneath the oil outlet, and an inlet for liquid from a well connected into the chamber between said outlets, a valve controlling the water discharge outlet, means normally maintaining the valve closed, automatically operable electrical means including electrodes at different levels and affected by variations in the level of the water in the chamber and effective to intermittently open the valve and electrically controlled latch means for temporarily holding the valve open.

2. A separator comprising a container having a separating chamber provided with an oil outlet, a water discharge outlet beneath the oil outlet, and an inlet for oil and water from a well, said inlet being arranged to discharge its liquid into the chamber between said outlets, a valve controlling the water discharge outlet, means normally holding the valve closed, electrically operable means including electrodes at different levels, whereby said holding means will be affected by variations of the water level in the chamber and said electrically operable means will be rendered effective to intermittently open the valve and electrically controllable latch means for latching the valves open.

3. A separator comprising a container having a separating chamber provided with an oil outlet, a water discharge outlet beneath the oil outlet and an inlet, for liquid from a well, connected into the chamber between said outlets, a valve controlling the water discharge outlet, means normally maintaining the valve closed, automatically operable means affected by variations in the level of the water in the chamber and effective to intermittently open the valve, and an equalizing conduit leading from the top of the chamber and having a connection with the water discharge outlet between the container and the valve.

4. In combination, a flow line for oil leading from a well, a separator connected into the line and having a collecting chamber into which water in the oil may settle therefrom, a discharge line leading from the settling chamber for the discharge of the water therefrom, a valve controlling the discharge line, electrically operable means effective, when actuated, to open the valve to permit such discharge, an electrical device arranged to actuate the valve opening means when the water in the chamber has reached a predetermined level to open the valve, means for latching the valve open, said electrical device being effective to release the latch means and valve opening means when said level is lowered, and means for closing the valve upon such release.

5. A separator comprising a container having a separating chamber provided with an oil outlet, a water discharge outlet beneath the oil outlet, and an inlet for oil and water from a well, said inlet being arranged to discharge its liquid into the chamber between said outlets, a valve controlling the water discharge outlet, means normally holding the valve closed, automatically operable means affected by variations of the water level in the chamber and effective to intermittently open the valve, a drain nozzle having a sight gauge and leading from the chamber at approximately the normal water level, a drain line leading out from the lower end of said chamber and connected into the water discharge line out beyond the valve.

6. A separator comprising a container having a separating chamber provided with an oil outlet, a water discharge outlet beneath the oil outlet, and an inlet for oil and water from a well, said inlet being arranged to discharge its liquid into the chamber between said outlets, a valve controlling the water discharge outlet, means normally holding the valve closed, automatically operable means affected by variations of the water level in the chamber and effective to intermittently open the valve and maintain the valve open for a predetermined length of time, a sight drain nozzle leading from the chamber at approximately the normal water level, a drain line leading out from the lower end of said chamber and connected into the water discharge line out beyond the valve, said drain nozzle being connected into the drain line.

7. The combination with a liquid conducting line leading from a source of liquid and adapted to conduct oil containing water and having branches, one provided with a choke therein, of a liquid container connected into the line between the choke and said source, said container having a collecting chamber into which water in the oil may settle therefrom, the other branch forming a discharge line leading from the settling chamber for the discharge of the water therefrom, a valve controlling the discharge line, a manifold having valve-controlled connections into the container above and beneath, respectively, the normal level of the water therein, said manifold being bodily removable from said connections, means normally holding the discharge line valve closed, electrically operable means affected by variations of the water level in the manifold and effective to intermittently open the discharge valve in accordance with variations of the water level in the manifold.

8. The combination with a liquid conducting conduit having a controlling valve, of electrically operable means for automatically opening the valve intermittently, electrically controlled means for latching the valve open, said means including an electrode adapted to be anchored to the wall of the conduit and having a body of conducting material insulated from said wall and arranged to project into the conduit and formed with a plurality of external surface projections to provide multiple contacts with the liquid.

9. In apparatus for separating the oil, gas, and and water flowing under pressure from an oil well, said apparatus having a separating chamber provided with an inlet line from the well and outflow lines for the oil and water; a valve controlling the water outflow line, means for intermittently opening and closing the valve to allow the intermittent discharge of water from the chamber, an equalizing line having connection with the water outlet line on the upstream side of the valve and connected into the gas compartment of the chamber to cushion the shock of the surge of oncoming liquid when the valve is closed.

10. In apparatus for separating water from oil and having a conduit for well liquid formed with a separating chamber provided with an oil outlet line and a water discharge line, means for controlling the discharge line, means for intermittently opening and closing the controlling means to permit the discharge of water intermittently from the chamber whereby the level of the liquid in the chamber will be varied, the inner end of the oil outflow line having an upturned receiving nozzle in the chamber whose upper end is located between the extreme levels of said liquid, said nozzle having capacity to contain a sufficient volume of oil to maintain a substantially continuous flow of liquid through the oil outflow line irrespective of variations in said level.

11. A separator comprising a container having a separating chamber provided with an oil outlet, a water discharge outlet beneath the oil outlet and an inlet for liquid from a well connected into the chamber between said outlets, a valve controlling the water discharge outlet, means normally maintaining the valve closed, automatically operable electrical means including electrodes at different levels and affected by variations in the level of the water in the chamber and effective to intermittently open the valve and electrically controlled means for temporarily holding the valve open.

12. A separator comprising a container having a separating chamber provided with an oil outlet, a water discharge outlet beneath the oil outlet and an inlet for oil and water from a well, said inlet being arranged to discharge its liquid into the chamber between said outlets, a valve controlling the water discharge outlet, means normally holding the valve closed, electrically operable means including electrodes at different levels whereby said holding means will be affected by variations of the water level in the chamber and said electrically operable means will be rendered effective to intermittently open the valve and electrically controllable means for temporarily holding the valve open.

13. In a separator a container for liquid having upper and lower outlets and an inlet, an upper electrode and a lower electrode in the container and affected by variations of the level of liquid in the container, a low voltage and low amperage electrical control circuit into which the electrodes are connected, a valve controlling the outlet, an electrical operating circuit of higher amperage including means effective to open the valve upon completion of the last mentioned circuit, an electrically operable amplifier arranged to be affected by the control circuit and to complete the operating circuit whereby the valve will be opened and electrically operable means for temporarily holding the valve open.

14. In a separator a container for liquid having upper and lower outlets and an inlet, an upper single pole electrode and a lower single pole electrode in the container and affected by variations in the level of the liquid in the container, a low voltage and low amperage electrical control circuit into which the electrodes are connected, a valve controlling the outlet, an electrical operating circuit of higher amperage than the control circuit and including means effective to open the valve upon completion of the operating circuit, an electrically operable amplifier arranged to be affected by the control circuit and to complete the operating circuit whereby the valve will be opened and electrically operable means for temporarily holding the valve open.

LEWIS A. PARSONS.